(12) United States Patent
Ur

(10) Patent No.: US 7,580,888 B2
(45) Date of Patent: Aug. 25, 2009

(54) FACILITATING SIMULATED PURCHASES OF ITEMS BY VIRTUAL REPRESENTATIONS OF PARTICIPANTS IN COMPUTER-BASED SIMULATIONS

(75) Inventor: Shmuel Ur, Shorashim (IL)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 11/531,091

(22) Filed: Sep. 12, 2006

(65) Prior Publication Data

US 2008/0086382 A1    Apr. 10, 2008

(51) Int. Cl.
*G06Q 40/00*    (2006.01)
*G06Q 30/00*    (2006.01)
*G06F 17/30*    (2006.01)

(52) U.S. Cl. .............................. 705/40; 705/26; 705/27
(58) Field of Classification Search .................... 705/26, 705/27
See application file for complete search history.

(56) References Cited

U.S. PATENT DOCUMENTS

| 6,032,129 | A | 2/2000 | Greef et al. | |
|---|---|---|---|---|
| 2002/0002514 | A1* | 1/2002 | Kamachi et al. | 705/27 |
| 2002/0007319 | A1* | 1/2002 | Yu | 705/26 |
| 2002/0169665 | A1 | 11/2002 | Hughes et al. | |
| 2006/0004659 | A1 | 1/2006 | Hutchison et al. | |
| 2006/0178968 | A1* | 8/2006 | Jung et al. | 705/35 |

FOREIGN PATENT DOCUMENTS

JP    2004062539 A  *  2/2004
WO    WO 0062231 A1   10/2000

OTHER PUBLICATIONS

Roaming Virtual World Is a Real Trip; [Final Edition] Leslie Walker. The Washington Post. Washington, D.C.: Mar. 30, 2006.*
E-Entrepreneurship: Learning in a Simulated Environment Salim Jiwa, Dawn Lavelle, Arjun Rose. Journal of Electronic Commerce in Organizations. Hershey: Jul.-Sep. 2005. vol. 3, Iss. 3.*
Roaming Virtual World is a Real Trip; [Final Edition] Leslie Walker. The Washington Post. Washington, D.C.: Mar. 30.*
Y. Zhao et al., "A 3D virtual shopping mall that has the intelligent virtual purchasing guider and cooperative purchasing functionalities", *CSCWD 2004—8th International Conference on Computer Supported Cooperative Work in Design—Proceedings*, 2004, p. 381-385.
V. Stojanovic, "Virtual boutique-try clothes on-line", *5th International Conference on Telecommunications in Modern Satellite, Cable and Broadcasting Service. TELSIKS 2001. Proceedings of Papers (Cat. No. 01EX517)*, 2001, pt. 2, p. 802-3 vol. 2.

* cited by examiner

*Primary Examiner*—Daniel S Felten
*Assistant Examiner*—William E Rankins

(57) ABSTRACT

A method for facilitating simulated purchases by virtual representations of participants in computer-based simulations of items outside of the context of computer-based simulations, the method including receiving a simulated payment for an item for purchase, where the simulated payment is associated with a virtual representation of a participant in a computer-based simulation, where the item is available for purchase outside of the context of the simulation, and where the simulated payment is received outside of the context of the simulation, and providing a description of the item to a process of the simulation, where the description is provided subsequent to receiving the simulated payment, where and the description is provided in association with the virtual representation.

7 Claims, 2 Drawing Sheets

US 7,580,888 B2

FACILITATING SIMULATED PURCHASES OF ITEMS BY VIRTUAL REPRESENTATIONS OF PARTICIPANTS IN COMPUTER-BASED SIMULATIONS

FIELD OF THE INVENTION

The present invention relates in general to electronic commerce and computer gaming, and in particular to synthetic systems and methods therefor.

BACKGROUND OF THE INVENTION

Creators of computer-based simulations, including computer-based games such as The Sims™, often seek to provide simulations of real-life experiences, such as where virtual representations of participants in computer-based simulations, known as "avatars," are able to "purchase" simulated goods and services within the context of a computer-based simulation. Thus, an avatar may buy simulated clothing in simulated stores, simulated houses and other simulated properties, provided that the computer-based simulation in which the avatar exists provides such capabilities.

SUMMARY OF EMBODIMENTS OF THE INVENTION

Embodiments of the present invention disclose systems and methods for providing a synthetic experience where an avatar in a computer-based simulation is able to interact with environments that are outside of the context of the computer-based simulation.

In one aspect of the present invention a method is provided for facilitating simulated purchases by virtual representations of participants in computer-based simulations of items outside of the context of computer-based simulations, the method including receiving a simulated payment for an item for purchase, where the simulated payment is associated with a virtual representation of a participant in a computer-based simulation, where the item is available for purchase outside of the context of the simulation, and where the simulated payment is received outside of the context of the simulation, and providing a description of the item to a process of the simulation, where the description is provided subsequent to receiving the simulated payment, where and the description is provided in association with the virtual representation.

In another aspect of the present invention a system is provided for facilitating simulated purchases by virtual representations of participants in computer-based simulations of items outside of the context of computer-based simulations, the system including simulated payment information for an item for purchase, where the simulated payment is associated with a virtual representation of a participant in a computer-based simulation, where the item is available for purchase outside of the context of the simulation, and where the simulated payment is received outside of the context of the simulation, a description of the item, where the description is provided subsequent to receiving the simulated payment, where and the description is provided in association with the virtual representation, and a computer configured to store the description, receive the simulated payment, and provide the description to a process of the simulation.

In another aspect of the present invention a computer program is provided embodied on a computer-readable medium, the computer program including a first code segment operative to receive a simulated payment for an item for purchase, where the simulated payment is associated with a virtual representation of a participant in a computer-based simulation, where the item is available for purchase outside of the context of the simulation, and where the simulated payment is received outside of the context of the simulation, and a second code segment operative to provide a description of the item to a process of the simulation, where the description is provided subsequent to receiving the simulated payment, where and the description is provided in association with the virtual representation.

BRIEF DESCRIPTION OF THE DRAWINGS

Embodiments of the present invention will be understood and appreciated more fully from the following detailed description taken in conjunction with the appended drawings in which.

DETAILED DESCRIPTION OF EMBODIMENTS OF THE INVENTION

The present invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

Figure 1:
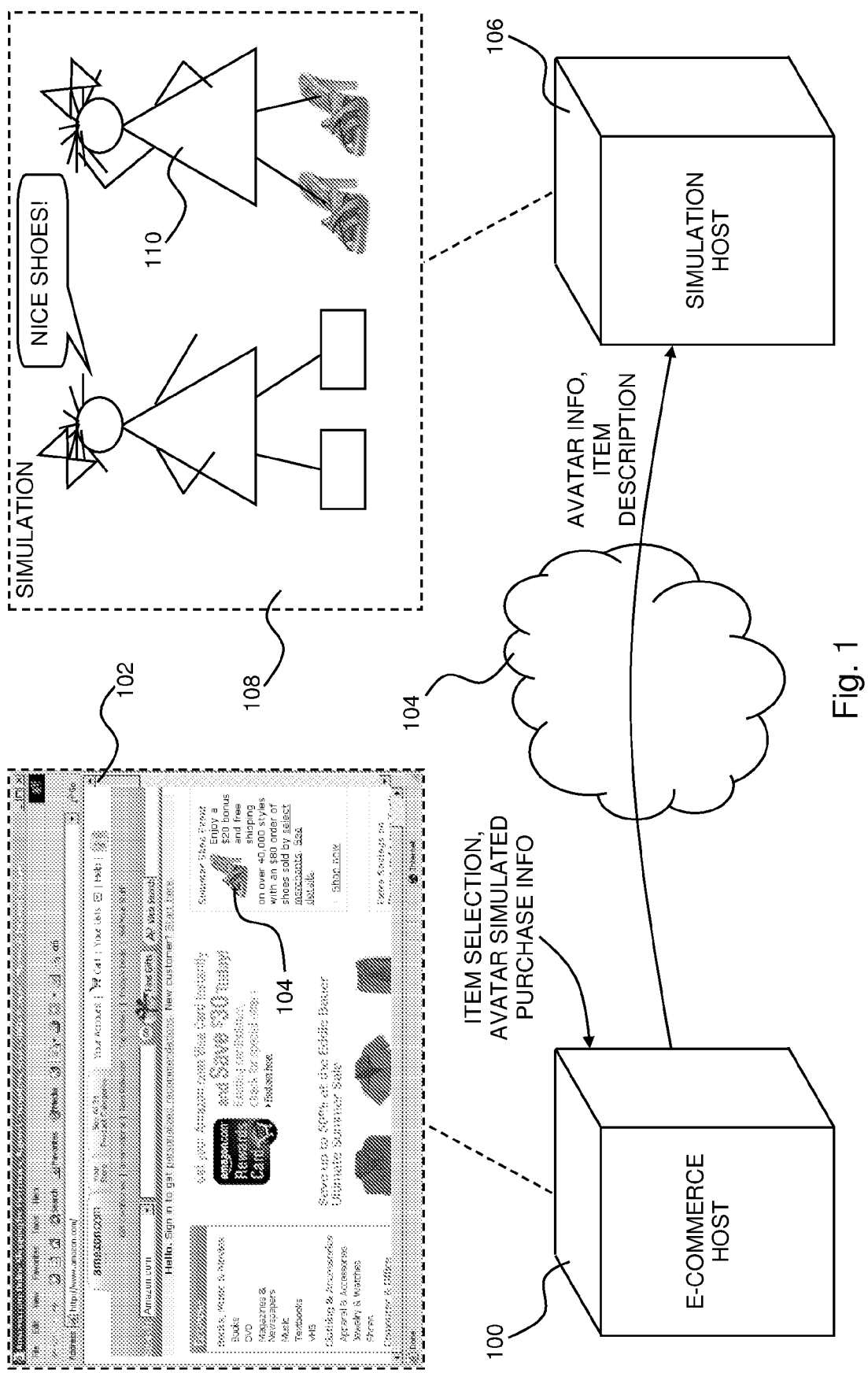
FIG. 1 is a simplified conceptual illustration of a system for facilitating simulated purchases by virtual representations of a participants in computer-based simulations of items outside of the context of computer-based simulations, constructed and operative in accordance with an embodiment of the present invention.
Figure 2:
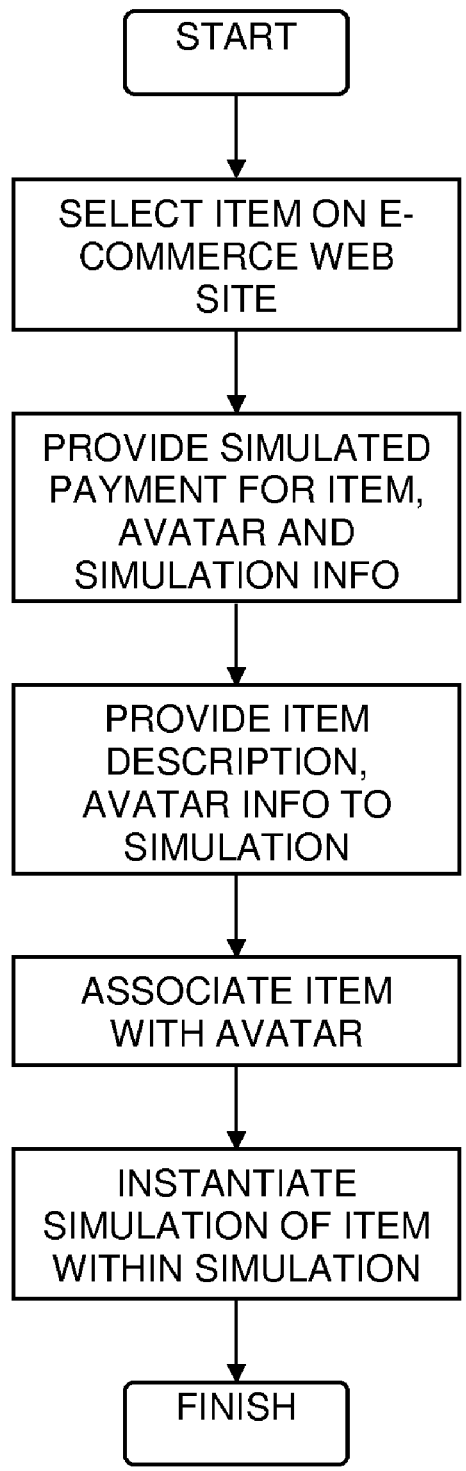
FIG. 2 is a simplified flowchart illustration of an exemplary method of operation of the system of FIG. 1, operative in accordance with an embodiment of the present invention.

Reference is now made to FIG. 1, which is a simplified conceptual illustration of a system for facilitating simulated purchases by virtual representations of a participants in computer-based simulations of items outside of the context of computer-based simulations, constructed and operative in accordance with an embodiment of the present invention, and additionally to FIG. 2, which is a simplified flowchart illustration of an exemplary method of operation of the system of FIG. 1, operative in accordance with an embodiment of the present invention. In the system of FIG. 1 and method of FIG. 2, an electronic commerce (e-commerce) host computer 100 is shown hosting an e-commerce web site 102, such as amazon.com™, that offers various items for purchase, such as ladies' shoes 104. A simulation host 106 is also shown hosting a computer-based simulation 108, such as a computer-based game or virtual-reality environment. Simulation 108 may include one or more avatars 110, such as may represent human participants who interact with simulation 108.

A simulated purchase of an item on e-commerce web site 102 and on behalf of avatar 110 may be performed by providing e-commerce host 100 with an item selection together with simulated purchase information which preferably includes a simulated payment, as well as information identifying simulation 108 and avatar 110. The simulated payment may be in the form of fictitious credit card information that is known by e-commerce host 100 to be fictitious and/or known to be associated with simulation 108 and therefore fictitious. Alternatively, the payment may be simply flagged as being simulated, such as by checking a "Simulated Purchase" checkbox.

Once the simulated purchase has been made, e-commerce host 100 provides a description of the item whose purchase was simulated, along with information identifying avatar 110, to simulation host 106, preferably via a network 112, such as the Internet. The information may be provided using any protocol, including via electronic mail (email), to a destination known to e-commerce host 100 or provided together with the purchase information. The description of the item may include an image of the item and/or information that may be used to represent the item within simulation 108, such as color, dimensions, and/or other item characteristics. E-commerce host 100 associates the item with avatar 110 and preferably instantiates a simulation of the item within simulation 108, such as by displaying an image of the item. Thus, in the example shown in FIG. 1, a simulated purchase of ladies' shoes 104 may be made for avatar 110, whereupon a simulation of shoes 104 are displayed on the feet of avatar 110 within simulation 108. Simulation host 106 may also provide a simulation of the item as a user-interactive object, such as may be clicked-on and/or dragged using a mouse.

E-commerce host 100 may additionally facilitate the simulated purchase of an item by generating a shopping environment in accordance with an attribute value associated with avatar 110. For example, simulated physical measurements of avatar 110 may be provided to e-commerce host 100 which then provides a virtual dressing room and clothing suggestions that suit avatar 110's measurements.

E-commerce host 100 may be credited for simulated purchases with simulated currency, which may be exchanged for legal tender at an exchange rate.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

What is claimed is:

1. A method for facilitating simulated purchases by virtual representations of participants in computer-based simulations of items outside of the context of computer-based simulations, the method comprising:
   providing for display by a computer a representation of an item for purchase; receiving at a first computer a simulated payment for an said item for purchase, wherein said simulated payment is associated with a virtual representation of a participant in a computer-based simulation, wherein said item is available for purchase outside of the context of said simulation, and wherein said simulated payment is received outside of the context of said simulation; and
   sending a description of said item from said first computer to a process of said simulation, wherein said process is executed by a second computer, wherein said description is provided subsequent to receiving said simulated payment, and wherein and said description is provided in association with said virtual representation.

2. A method according to claim 1 wherein either of said providing, said receiving and said sending are performed via a computer network.

3. A method according to claim 1 wherein said providing comprises sending said description via email.

4. A method according to claim 1 and further comprising:
   receiving at said first computer an attribute value of said virtual representation; and generating at said first computer a shopping environment in accordance with said attribute value.

5. A method according to claim 1 and further comprising receiving at said first computer an indication that said simulated payment is associated with said virtual representation.

6. A method according to claim 1 and further comprising receiving at said first computer simulated currency for said item, wherein said simulated currency is convertible to legal tender at an exchange rate.

7. A computer program product for facilitating simulated purchases by virtual representations of participants in computer-based simulations of items outside of the context of computer-based simulations, said computer program product comprising:
   a computer readable medium;
   program instructions configured to provide for display by a computer a representation of an item for purchase;
   program instructions configured to receive a simulated payment for an item for purchase, wherein said simulated payment is associated with a virtual representation of a participant in a computer-based simulation, wherein said item is available for purchase outside of the context of said simulation, and wherein said simulated payment is received outside of the context of said simulation; and
   program instructions configured to provide a description of said item to a process of said simulation, wherein said description is provided subsequent to receiving said simulated payment, wherein and said description is provided in association with said virtual representation, wherein said program instructions are stored on said computer readable medium.

* * * * *